United States Patent Office 3,301,823
Patented Jan. 31, 1967

3,301,823
PROCESS FOR THE PRODUCTION OF HIGHLY ELASTIC POLYURETHANES UTILIZING DI-HYDRAZINO-DI-S-TRIAZINE COMPOUNDS AS CHAIN EXTENDERS
Robert Gehm, Ludwigshafen (Rhine), Joachim Kunde, Frankenthal, Pfalz, and Friedrich Mertes, Ludwigshafen (Rhine), Germany, assignors to Badische Anilin- & Soda - Fabrik Aktiengesellschaft, Ludwigshafen (Rhine), Germany
No Drawing. Filed Dec. 3, 1964, Ser. No. 415,777
Claims priority, application Germany, Dec. 6, 1963, B 74,560
3 Claims. (Cl. 260—75)

This invention relates to a process for the production of highly elastic molded articles based on polyurethanes, in which process isocyanate-modified polyhydroxy compounds are reacted with dihydrazino-di-s-triazino compounds.

It is known that it is possible, by the reaction of isocyanate-modified polyhydroxy compounds with diamines or hydrazine in solution, to produce polymers that may be processed into elastic films or fibers having good performance characteristics. Because of the great speed of the reaction, such processes are difficult to carry out.

It is also known that in the production of such highly elastic molded articles there may be used, instead of diamines, the less reactive dihydrazides or cyanuric hydrazides. The use of dihydrazides sometimes presents difficulties, since many of these compounds are sparingly soluble. In the case of the polymers prepared with cyanuric hydrazides as chain-length increasers it is not always possible to sufficiently vary the properties of the polymers.

We have now found that the production of highly elastic molded articles by the reaction, in solution, of substantially linear isocyanate-modified polyhydroxy compounds having molecular weights of about 750 to about 6,000 and terminal isocyanate groups with chain-length increasers having at least two reactive hydrogen atoms and subsequent molding while removing the solvent by heating, may be advantageously carried out by using, as chain-length increasers having at least two reactive hydrogen atoms, dihydrazino-di-s-triazino compounds in which monohydrazino-s-triazines are combined via a bivalent diamine radical.

Such compounds may for example have the formula

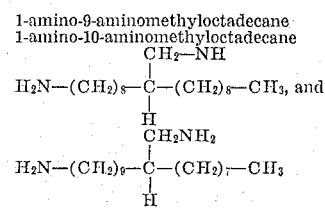

A denotes a bivalent straight-chain, branched or heterocyclic diamine radical which is attached to the triazine rings via its amino nitrogen atoms, e.g. a hydrazine or an aliphatic diamine radical having preferably 2 to 12 carbon atoms in the chain, such as an ethylenediamine, propylenediamine, hexamethylenediamine, octamethylenediamine or decamethylenediamine radical. Examples of heterocyclic diamines suitable as A are bivalent radicals of piperazine or N,N'-di-(aminopropyl)-piperazine. B denotes hydrogen, an $-OR_1$ group, an $-NR_1R_2$ group, or an alkyl, aryl, aralkyl or cycloalkyl group having from 1 to 8 carbon atoms. $R_1$ and/or $R_2$ are hydrogen, alkyl, aryl, aralkyl or cycloalkyl groups having from 1 to 8 carbon atoms.

The new chain-length increasers of the type described above may be prepared by various methods, for example by reacting 2 moles of 2,4-dichloro-s-triazines with 1 mole of a diamine, e.g. ethylenediamine, in the presence of alkali at low temperature and replacing the remaining halogen atoms by hydrazine at elevated temperature. The compounds may also be prepared by a method analogous to that according to U.S. patent specification 3,051,704.

By varying the bridge member A the properties of the polymers in whose preparation the compounds according to this invention are coemployed may be varied within wide limits. Thus polymers having particularly great thermostability are obtained by using dihydrazino-di-(s-triazines) whose bridge members A consist of short-chain diamines, such as hydrazine, ethylenediamine or piperazine. Coatings obtained from compounds in which conventional chain-length increasers are used, sometimes exhibit a poor handle. This may be greatly improved by using, in accordance with this invention, chain-length increasers which contain longer-chain branched aliphatic diamine radicals as bridge members. Examples of such compounds suitable as bridge members are mixtures of 1-amino-9-aminomethyloctadecane
1-amino-10-aminomethyloctadecane

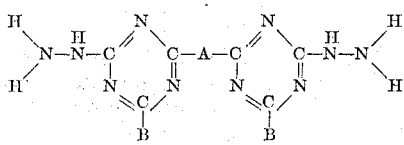

Coatings of such polymers are distinguished by a particularly soft handle.

The reaction of the isocyanate-modified polyhydroxy compounds with the dihydrazino-di-s-triazino compounds is advantageously carried out in inert polar solvents, such as dimethyl formamide, dimethyl acetamide, tetramethylurea or tetramethylenesulfone. These solvents may also be used in admixture with one another or with other, less polar solvents, such as tetrahydrofuran or dioxane.

In the process according to this invention, up to about 10 wt. percent solutions of the said dihydrazino-di-s-triazino compounds, which may be heated, are advantageously introduced with vigorous stirring into about 10 to 50 wt. percent solutions of isocyanate-modified polyhydroxy compounds, which preferably are at about room temperature. It is also possible to place the solution of the dihydrazino-di-s-triazino compound in a vessel and to add to it the solution of the isocyanate-modified polyhydroxy compound. The solution of the isocyanate-modified polyhydroxy compound and that of the dihydrazino-di-s-triazino compound may be mixed by conventional mixing means, e.g. by nozzles. Immediately on mixing the solutions there are formed solutions of low to high viscosity depending on the solids content. These solutions are stable and practically colorless. Conventional additives, such as fillers, pigments, dyes or stabilizers, may be added to the solutions prior to molding. The solutions are then made into molded articles in conventional manner. Films are produced for example by applying the solutions onto plates or endless belts and removing the solvent, and filaments for example by spinning the solutions by conventional dry or wet spinning methods. The filaments are highly elastic and are particularly suitable for textile materials, such as corsetry, sportswear and medical articles.

Highly elastic coatings may be obtained for example by immersing the articles in question in solutions containing the polymer, taking them out of the solution and removing the solvent. Such coatings are particularly suitable for parts that are subjected to tensile or bending stress.

Examples of suitable polyhydroxy compounds having terminal hydroxyl groups and which are reacted with diisocyanates to isocyanate-modified polyhydroxy compounds in known manner, are conventional polyethers, polythioethers, polyesters or polyacetals with terminal hydroxyl groups and such molecular weights that the isocyanate-modified polyhydroxy compounds have molecular weights of about 750 to about 6000 and a melting point below 50° C. Examples of such hydroxyl-containing polyethers and polythioethers are polymers of ethylene oxide, propylene oxide or tetrahydrofuran, their copolymers, or their addition products with polyols, such as glycol, butanediol and polymers of thiodiglycols. Suitable polyesters may for example be prepared from dicarboxylic acids usually used for this purpose, such as adipic, azelaic, sebacic and decanedicarboxylic acids, straight-chain and branched diols, such as ethylene glycol, butanediol-1,4, hexanediol-1,6, propylene glycol-1,2, butanediol-1,2, butanediol-1,3, 2,2-dimethylhexanediol-1,3, butanediol-2,3, 2,2-dimethylpropanediol-1,3, hexanediol-2,5, the proportions of straight-chain compounds and compounds that are branched or cause branching in the polyester chain being advantageously so selected that the polyester formed has a melting point below 50° C. Suitable polyacetals may for example be prepared from polyhydric alcohols and aliphatic aldehydes, e.g. from formaldehyde or p-formaldehyde and hexanediol, methylhexanediol, heptanediol, octanediol or cyclic acetals, such as butanediol formal. The said polyhydroxy compounds advantageously have two terminal hydroxyl groups and may be obtained by conventional methods. Their preparation is not an object of the present invention.

To prepare the isocyanate-modified polyhydroxy compounds, the polyethers, polythioethers, polyesters and polyacetals may be reacted with the diisocyanates either alone or in admixture in conventional manner. Polyhydroxy compounds having molecular weights of about 1,000 may first be converted into higher-molecular-weight polyhydroxy compounds using a deficiency of diisocyanate; the latter are then modified with a further amount of diisocyanate.

The conventional reaction of polyhydroxy compounds with diisocyanates is advantageously carried out in a molar ratio of 1:2 at temperatures between 80 and 120° C. during a period of one to two hours. To obtain special-grade products having different elasticity, higher or lower molar ratios may be used. The polyhydroxy compounds may be reacted with diisocyanates either in the absence or presence of conventional inert solvents, such as methylene chloride of benzene. However, in the case of isocyanate-modified polyhydroxy compounds prepared in the presence of apolar solvents it is advantageous to remove the solvent before using the compounds. Particularly suitable isocyanates are aromatic diisocyanates, such as 1,4-phenylene diisocyanate, 4,4'-diphenyl diisocyanate, 4,4'-diphenylmethane diisocyanate, 1,5-naphthylene diisocyanate or toluylene diisocyanate. Aliphatic diisocyanates, such as hexamethylene diisocyanate or diisocyanates which may be prepared by partial or total hydrogenation of the aromatic diisocyanates mentioned above, are also suitable.

The invention is further illustrated by the following examples in which parts are by weight.

*Example 1*

34 parts of a copolyester (molecular weight 1,700) prepared in conventional manner from adipic acid and hexanediol-1,6/hexanediol-2,5 (molar ratio 2:1) is mixed, while excluding humidity, with 10 parts of 4,4'-diphenylmethane diisocyanate for two hours at 100° C. with stirring, the reaction vessel being rinsed with nitrogen. After cooling, the isocyanate content of the mixture is 3.31%. The mixture is diluted with 44 parts of dimethyl formamide; then a solution, heated to about 40° C. of 9.72 parts of dihydrazino-di-s-triazine having the formula

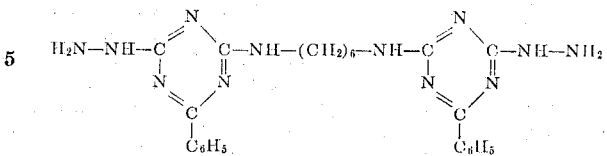

in 424 parts of dimethyl formamide is added with vigorous stirring. The viscosity of the solution increases appreciably. The polymer solution is poured onto a glass sheet in a layer 4 mm. thick and the solvent evaporated. A highly elastic non-tacky film is obtained.

*Example 2*

25.9 parts of a copolyester (molecular weight 2,590) prepared from ethylene glycol/butanediol-1,4 (molar ratio 2:1) and adipic acid is mixed with 5 parts of 4,4'-diphenylmethane diisocyanate and the mixture heated for two hours at 100° C. After cooling, the isocyanate content of the mixture is 3.06%. The mixture is diluted with 30.9 parts of dimethyl formamide; then a solution, heated to about 50° C., of 4.74 parts of dihydrazino-di-s-triazine having the formula

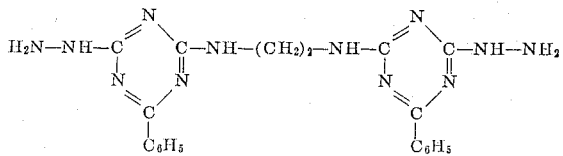

in 285 parts of dimethyl formamide is added with vigorous stirring. There is a marked increase in viscosity. Analogously to Example 1, highly elastic non-tacky films are obtained from this solution.

We claim:
1. A process for the production of highly elastic articles which comprises reacting, in an inert, polar solvent, (a) an isocyanate-modified polymer having a molecular weight of from about 750 to about 6,000 and prepared by reacting one mole of a polyhydroxy compound having terminal hydroxyl groups with at least two moles of an organic diisocyanate with (b) a compound having the general formula

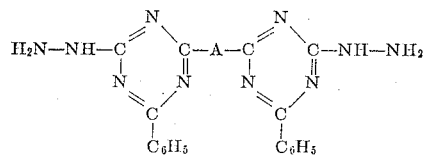

wherein A is alkylene having 2–12 carbon atoms, and evaporating said solvent from the resultant composition.

2. A process as claimed in claim 1 wherein A is ethylene.

3. A process as claimed in claim 1 wherein A is hexamethylene.

References Cited by the Examiner

UNITED STATES PATENTS

| | | | |
|---|---|---|---|
| 2,957,852 | 10/1960 | Frankenburg et al. | 260—75 |
| 3,004,945 | 10/1961 | Farago | 260—77.5 |
| 3,051,704 | 8/1962 | Gehm et al. | 260—240 |
| 3,149,998 | 9/1964 | Thurmaier | 260—77.5 |
| 3,216,975 | 11/1965 | Kunde et al. | 260—77.5 |

LEON J. BERCOVITZ, *Primary Examiner.*

DONALD E. CZAJA, *Examiner.*

J. J. KLOCKO, *Assistant Examiner.*

UNITED STATES PATENT OFFICE
CERTIFICATE OF CORRECTION

Patent No. 3,301,823　　　　　　　　　　　　　January 31, 1967

Robert Gehm et al.

It is hereby certified that error appears in the above numbered patent requiring correction and that the said Letters Patent should read as corrected below.

Column 4, lines 46 to 53, the formula should appear as shown below instead of as in the patent:

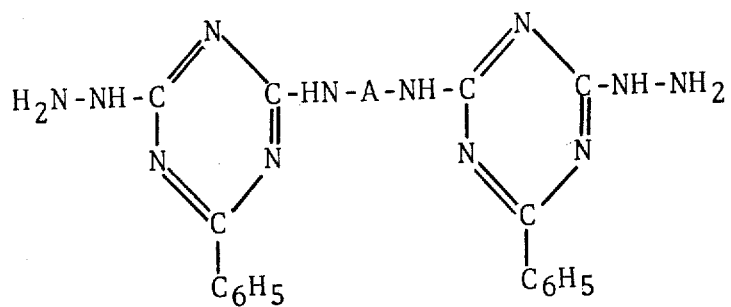

Signed and sealed this 28th day of November 1967.

(SEAL)
Attest:

EDWARD M. FLETCHER, JR.
Attesting Officer

EDWARD J. BRENNER
Commissioner of Patents